(12) United States Patent
Marshall et al.

(10) Patent No.: US 6,741,351 B2
(45) Date of Patent: May 25, 2004

(54) LED LUMINAIRE WITH LIGHT SENSOR CONFIGURATIONS FOR OPTICAL FEEDBACK

(75) Inventors: Thomas M Marshall, Haratsdale, NY (US); Michael D Pashley, Cortlandt Manor, NY (US); Frank J P Schuurmans, Valkenswaard (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/876,661

(22) Filed: Jun. 7, 2001

(65) Prior Publication Data

US 2003/0030808 A1 Feb. 13, 2003

(51) Int. Cl.$^7$ ............................................... G01N 21/25
(52) U.S. Cl. ........................................ 356/406; 359/629
(58) Field of Search ................................. 356/406, 416, 356/425, 420; 359/629, 618

(56) References Cited

U.S. PATENT DOCUMENTS

| | | | | |
|---|---|---|---|---|
| 3,760,174 A | * | 9/1973 | Boenning et al. | 315/312 |
| 5,471,052 A | * | 11/1995 | Ryczek | 250/226 |
| 5,739,915 A | * | 4/1998 | Gau et al. | 250/226 |
| 5,838,451 A | * | 11/1998 | McCarthy | 356/406 |
| 5,923,413 A | * | 7/1999 | Laskowski | 356/434 |
| 6,127,783 A | * | 10/2000 | Pashley et al. | 315/149 |
| 6,157,454 A | * | 12/2000 | Wagner et al. | 356/407 |
| 6,172,745 B1 | * | 1/2001 | Voser et al. | 356/445 |
| 6,373,568 B1 | * | 4/2002 | Miller et al. | 356/326 |

\* cited by examiner

*Primary Examiner*—David V. Bruce
*Assistant Examiner*—Thomas R. Artman

(57) ABSTRACT

White light emitting LED luminaire incorporates an array of red, green and blue emitting LEDs and a feedback arrangement to maintain a desired color balance. The feedback arrangement includes photodiodes positioned and enabled to separately measure the light output of each RGB color component. In one embodiment, a single photodiode or array of photodiodes is positioned to intercept reflected light from a partially reflecting element placed in the path of the combined output of the LED array. Individual colors are measured sequentially by pulsing the LEDs and photodiodes or by the use of color filters. In an alternate embodiment, each LED has an associated photodiode, either incorporated into the LED package or in a separate package.

14 Claims, 5 Drawing Sheets

LED LUMINAIRE WITH LIGHT SENSOR CONFIGURATIONS FOR OPTICAL FEEDBACK

BACKGROUND OF THE INVENTION

This invention relates to a white light emitting luminaire having an array of red, green and blue light emitting diodes (LEDs) and a control system for adjusting the light output of the individual components to maintain a desired color balance (chromaticity), and more particularly relates to such a luminaire having specific light sensor configurations for optical feedback.

White light emitting luminaries having arrays of red, green and blue LEDs (also known as RGB LED luminaries) are of interest for several reasons, including efficiency and low cost, and the ability to adjust the chromaticity of the light output.

One of the central problems to be addressed is the variation in light output of the LEDs from chip to chip, as well as over the life of each chip. Light output of the LEDs also varies inversely with temperature, but not uniformly for each color. In addition, light output will vary with the failure of individual chips within an LED array.

U.S. Pat. No. 6,127,783, issued to Michael D. Pashley and Thomas M. Marshall and assigned to Philips Electronics North America Corp., discloses a white light emitting luminaire with electronically adjusted color balance. The luminaire includes a plurality of LEDs in each of the colors red, green and blue with a separate power supply for each color and a photodiode arranged to measure the light output of all the LEDs. The light output of each color is measured by an electronic control circuit which turns off the LEDs for the colors not being measured in a sequence of time pulses. The measured light output for each color is compared to a desired output, which may be determined by user inputs, and corrections to the current for each color are made accordingly. The specification of U.S. Pat. No. 6,127,783 is hereby incorporated by reference into this specification.

In order to accurately control the output of such a luminaire, the total delivered light must be monitored accurately. This requires placing the photodiodes in such a manner that an equal fraction of light is sampled from each LED while allowing sufficient stray light from the LEDs to fall on the photodiode(s) to insure satisfactory operation of the feedback loop.

SUMMARY OF THE INVENTION

The invention provides several optical configurations for positioning one or more photodiodes, optionally with various color filters, in and around the lightpath of a RGB LED luminaire to achieve an equal fraction of light sampled from each LED in order that the total light output can be monitored accurately. Only minor modifications to a standard RGB LED luminaire's optical system are needed, and efficiency and other performance specifications are substantially unaffected. With the photodiodes so positioned, feedback signals are available to the control electronics to regulate both total light output and color balance.

In a first embodiment of the invention, a separate photodiode is incorporated into each LED package, which includes an LED chip and a lens to direct the light from the LED. The photodiode may be placed at a location to receive light directly or indirectly from the LED. Simulations have shown that reflections off the inner surface of the lens will allow sufficient stray light to fall on the photodiode to insure satisfactory operation.

In a second embodiment, a separate photodiode package is positioned immediately adjacent to each LED or a small group of LEDs (eg., 3 LEDs), with its entrance aperture or collection lens directed towards the LED to be monitored.

In a third embodiment, a partially reflecting element (typically about 1% reflection is sufficient) is positioned within the lightpath, after the main condenser lens, the partially reflecting element positioned and shaped to reflect a small portion of the output beam back through the condenser lens to focus at or slightly above the intersection of the optic axis with the plane of the LED array. At this focus is placed a light sensor assembly, including one or more photodiode(s), a white integrating chamber surrounding the photodiodes and a diffuser such as a planar diffusing screen between the chamber and the condensing lens. The light sensor assembly is arranged such that over a significant area (several times the size of one photodiode package) the flux from each LED is nearly constant. While this embodiment is the most elaborate, it offers the best performance, economy, and versatility.

In each of the embodiments, color filters may be associated with the photodiodes to render them selective to a particular spectral region of the RGB output, thus avoiding the need to pulse the LEDs and photodiodes as described in U.S. Pat. No. 6,127,783.

DETAILED DESCRIPTION OF THE PREFERRED EMBODIMENTS

Figure 1:
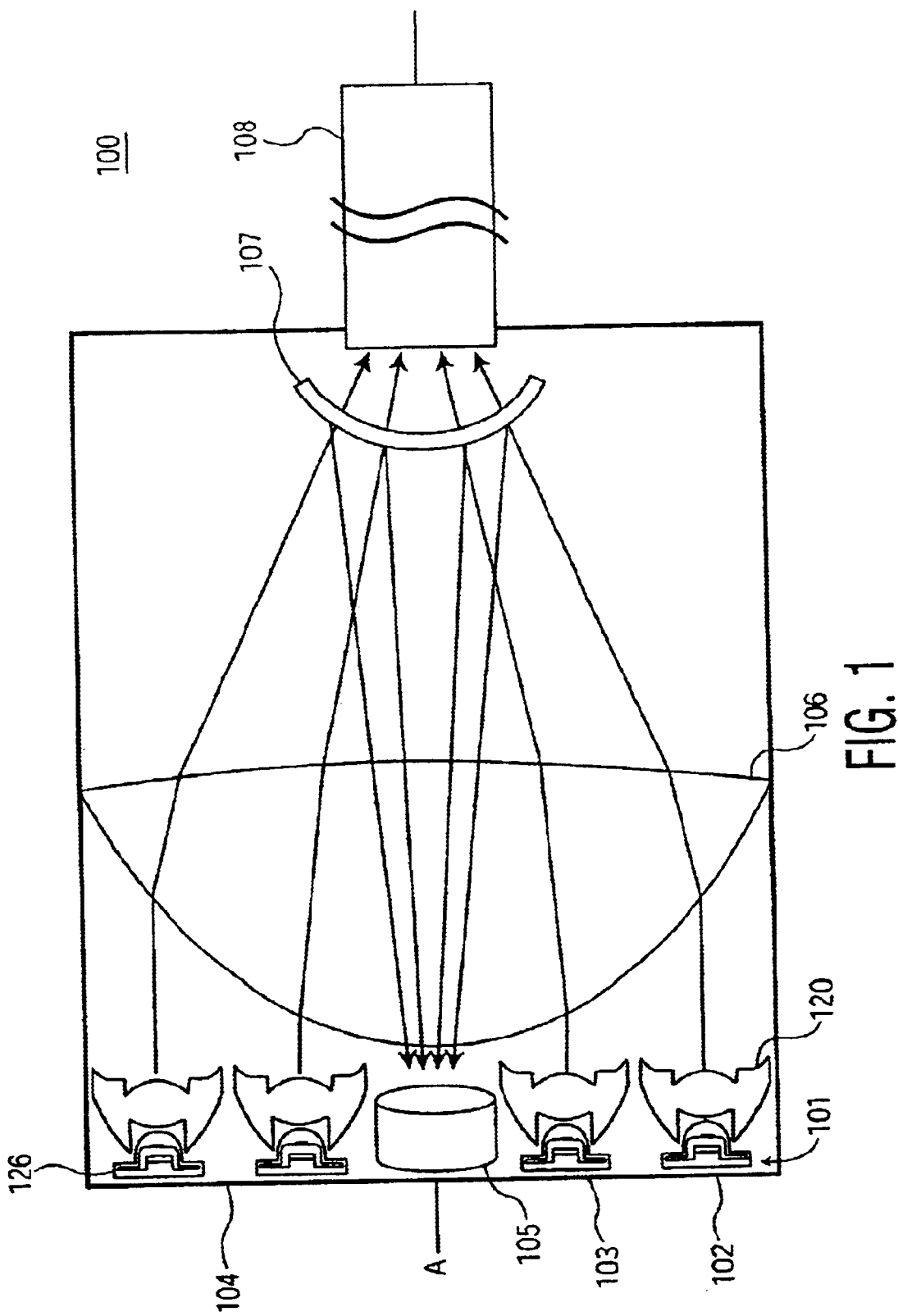
FIG. 1 shows a cross section of one embodiment of a LED luminaire of the invention, including a light sensor assembly positioned in the center of an array of red, green and blue emitting LEDs, and a partially reflecting element placed in the path of the combined light output of the array.

Referring to the drawings, FIG. 1 is a schematic cross-section of one embodiment of the optical components of an RGB LED luminaire of the invention, an LED array 101 comprises individual LED assemblies (102, 103, 104)

arranged in two concentric rings of individual LED assemblies around a central axis A. Each LED assembly includes a sealed LED package 126 and a collimator lens 120. Located on the central axis A is a light sensor assembly 105, including a diffuser 109, an integrator 110, and an array of photodiodes (112, 113, 114).

A main condenser lens 106 directs the light output from the LED array 101 toward a target light guide 108. A partial reflector 107 of appropriate shape is placed in the region between the main condenser lens 106 and the target light guide 108. The partial reflector 107 should have a total reflectivity of about 1 percent, which is less than that of most optical elements. This low reflectivity may be obtained by coating the optical element with a conventional anti-reflecting coating. The best results were obtained with a slightly aspheric concave shape, as illustrated in FIG. 1, but reasonably good results have also been obtained with a plane mirror configuration. Uncoated glass or plastic will work as well, but will needlessly reduce the overall system efficiency.

Figure 2:
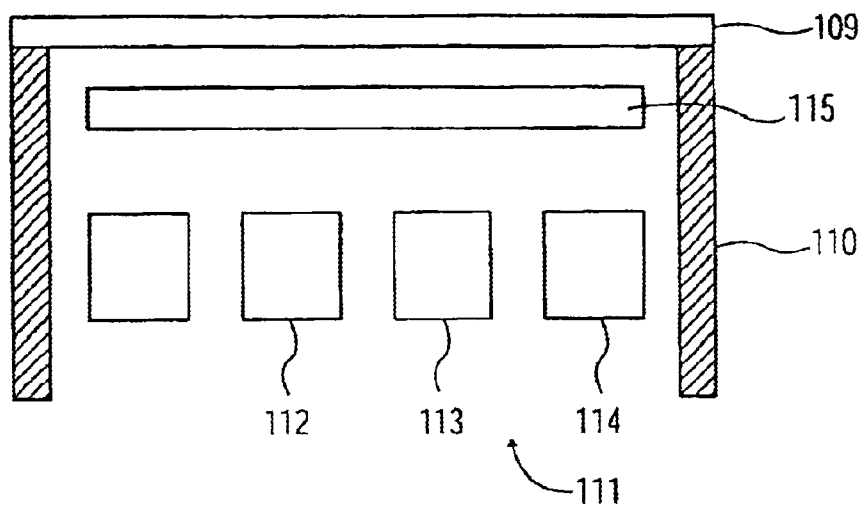
FIG. 2 shows details of the light sensor assembly of FIG. 1, including a photodiode array, a diffuser, an integrator and an optional variable color filter.
Figure 3:
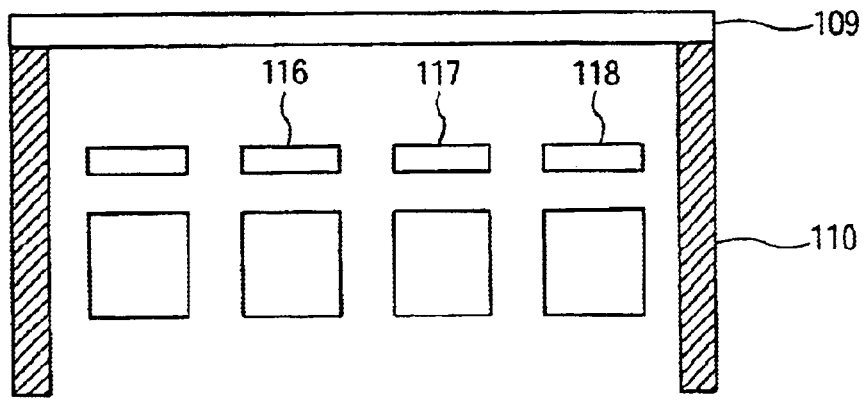
FIG. 3 shows an alternate embodiment of the light sensor assembly of FIG. 2, including individual color filters associated with each photodiode.

The light sensor assembly 105 is illustrated schematically in FIG. 1 as the single cylindrical object on axis near the center of the LED array. Many different configurations are possible, including single or multiple photodiodes and simpler or more elaborate integrator structures. Two representative embodiments are shown in FIGS. 2 and 3, in which the light sensor assembly includes a diffuser 109, an integrator 110 and a photodiode array 111.

The light sensor assembly 105 may be read synchronously with the pulsing of the different color LEDs in the LED array in the manner described in U.S. Pat. No. 6,127,783, in order to provide the information needed to adjust the color balance of the LED luminaire. Alternatively, pulsing of the LEDs may be avoided by the use of color filters to isolate the light output of the different color LEDs for measurement by the photodiodes. In one possible embodiment, a single variable color filter 115, shown in FIG. 2, may be periodically tuned to different color wavelength bands during light sensing. In another possible embodiment, different fixed color filters 116, 117, 118, may be associated with individual photodiodes 112, 113, 114, as shown in FIG. 3.

An exemplary optical subsystem consists of two concentric rings of six (inner) and 12 (outer) LED assemblies around a central (optical) axis, each assembly having a collimator lens of 15 mm diameter, and a simple light sensor assembly consisting of a hexagonal diffuser plate, a white paper tube forming a simple integrator structure, both also of 15 mm diameter; and four photodiode packages arranged inside the integrator chamber. The light sensor assembly was centered on the optical axis and extended vertically from the tops of the collimators down to the level of the LED chips. A planar mirror with an anti-reflection coating positioned between the main condenser lens and the target light guide was used as a partial reflector. This arrangement gave satisfactory light uniformity across the photodiode array. Better integration, leading to higher uniformity, is possible using a more carefully and accurately assembled design, at the expense of less total light collection.

Alternatives to the centrally located light sensor 105 are of course possible. For example, each LED package in the LED array may have an individual photodiode associated with it. Two different embodiments of such an association are shown for individual LED packages in FIGS. 4 and 5.

Figure 4:
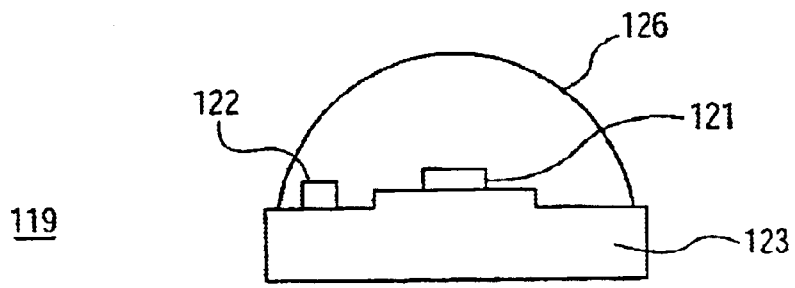
FIG. 4 shows in cross section a sealed package containing an individual LED of the LED array, the sealed package including an associated photodiode.

FIG. 4 shows a sealed LED package 119, including an LED chip 121 mounted on a substrate 123. Also mounted on the substrate 123 next to the LED chip 121 is a photodiode chip 122, positioned to measure light output from the LED. Covering LED chip 121 and photodiode chip 122 is lens 126, for directing light from the LED in a forward direction.

Figure 5:
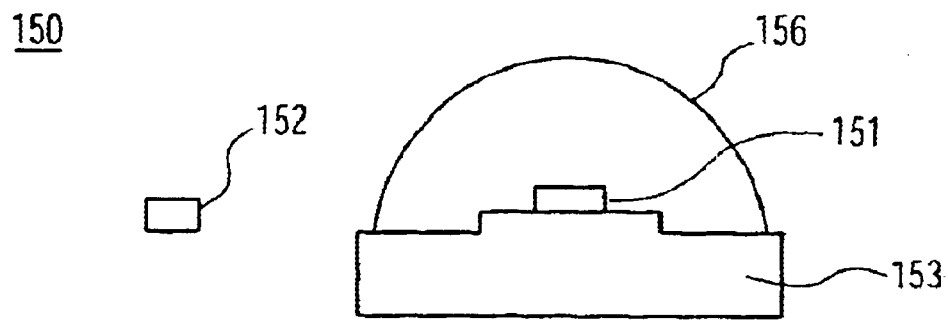
FIG. 5 shows in cross section a sealed LED package with an associated photodiode.

FIG. 5 shows a similar arrangement to that of FIG. 4, except that instead of having the photodiode chip mounted inside the sealed LED assembly 126, a separate photodiode package 152 is positioned to measure light output from the LED package 150. LED package 150 includes LED chip 151 mounted on substrate 153 and covered by lens 156.

Figure 6:
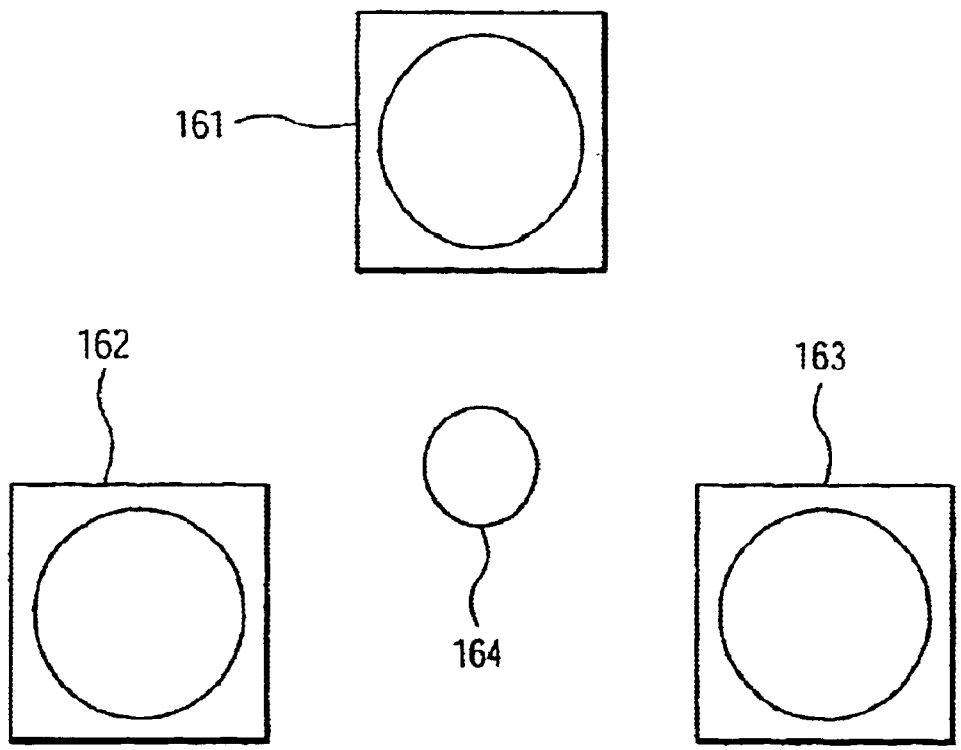
FIG. 6 shows an array of three LED packages with an associated photodiode.

FIG. 6 shows another arrangement in which an array of three LED packages 161, 162 and 163 are associated with a single photodiode 164.

Figure 7:
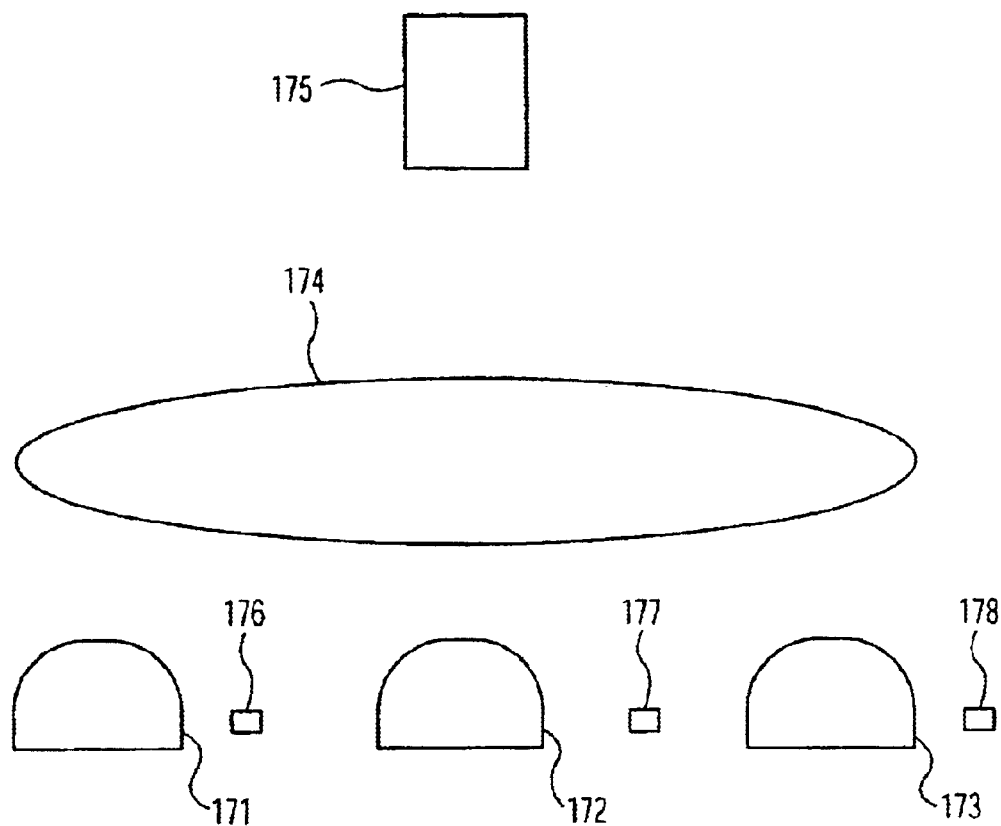
FIG. 7 shows shows a cross section of another embodiment of a LED luminaire of the invention, which is similar to that shown in FIG. 1, except that the partially reflecting element and the light sensor assembly have been replaced by an array of photodiodes associated with the array of LEDs.

FIG. 7 shows shows a cross section of another embodiment of a LED luminaire of the invention, which is similar to that shown in FIG. 1, except that the partially reflecting element and the light sensor assembly have been replaced by an array of photodiodes 176, 177 and 178, associated with the array of LEDs 171, 172 and 173 in the manner shown in FIG. 6. Of course, the individual photodiodes 176, 177 and 178 may each be incorporated into the LED packages as shown in the alternative arrangement of FIG. 4, or associated with a group of two or more LED packages as shown in FIG. 6. As in FIG. 1, light from the LED array is directed by condenser lens 174 to a target 175.

Figure 8:
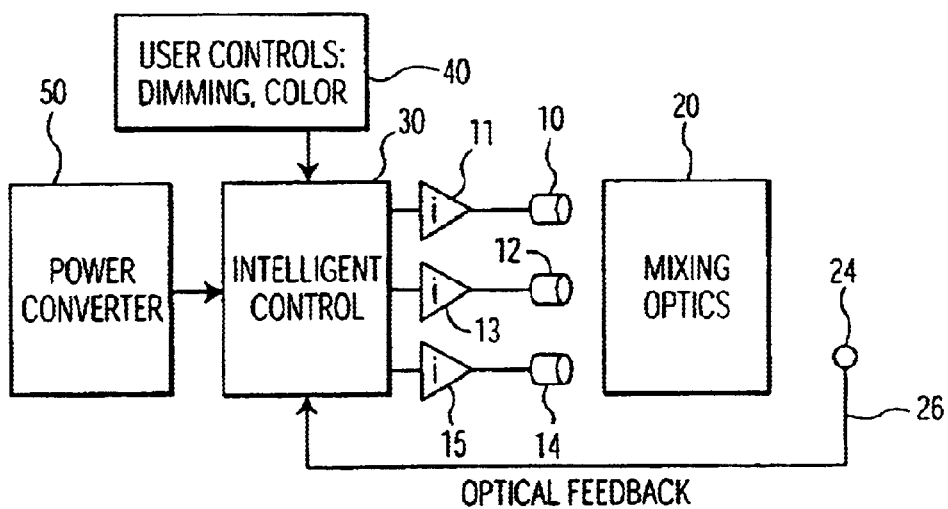
FIG. 8 is a schematic diagram of the optical and electrical systems of one embodiment of the RGB LED luminaire of the invention including optical feedback and control.

Referring to FIG. 8, a schematic diagram of the optical and electrical components of one embodiment of a luminaire of the invention, the controller 30 translates the feedback from the photodiode 24 into color point measurements, which are compared with desired settings provided via user inputs 40. Based on the comparison, the controller 30 decides whether the desired color balance is present, and accordingly signals the current regulators 11, 13, 15 for the respective diodes 10, 12, 14. A power input from the AC converter 50 is thus translated into current outputs, which control the light intensity for the respective colors red, green, and blue to obtain the desired color balance. The diodes fore each color of the array are kept at common potential by wiring on the substrate 16. User controls for the desired settings include inputs 41, 42, 43 for the respective colors, and a dimmer 44 which controls overall intensity of the resulting white light.

Figure 9:
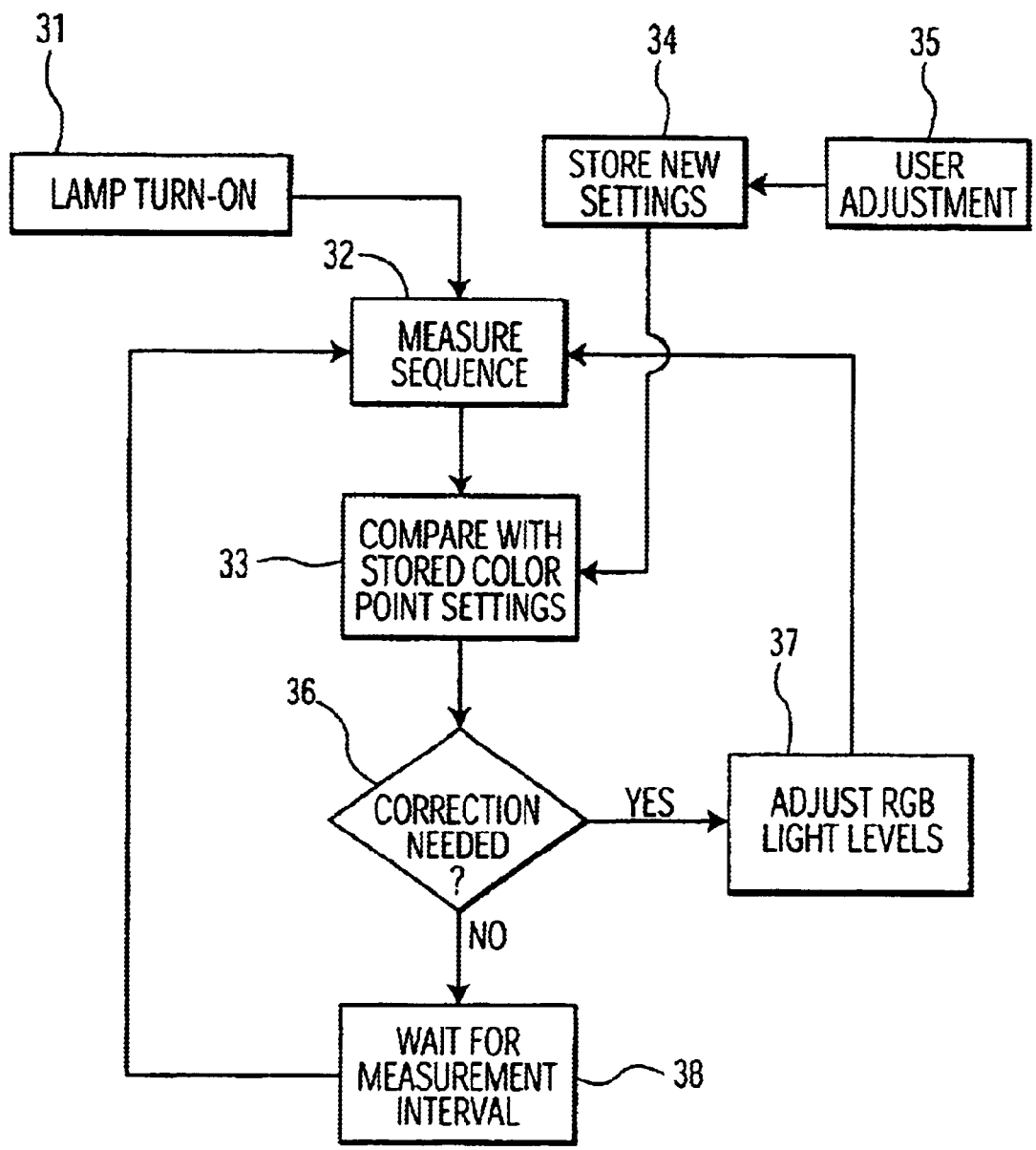
FIG. 9 is a diagram of the logic sequence for the optical feedback and control portion of the luminaire of FIG. 7.

FIG. 9 depicts the control logic for the luminaire of FIG. 8. When the lamp is turned on (31), power is provided to the LEDs and a measuring sequence is initiated (32). Color point measurements are compared (33) with desired settings, which are stored (34) pursuant to user adjustment (35). Based on this comparison, it is determined (36) whether color adjustments are necessary, and if so, adjustments are made (37) and the measuring sequence is repeated (32). If it is determined that color adjustments are not necessary (36), the controller will wait for a predetermined measuring interval (38) before repeating the measuring sequence (32).

The invention has necessarily been described in terms of a limited number of embodiments. From this description, other embodiments and variations of embodiments will become apparent to those skilled in the art, and are intended to be fully encompassed within the scope of the invention and the appended claims.

What is claimed is:

1. An LED luminaire comprising;
   an array of LEDs comprising at least one LED in each of plurality of colors,
   a condenser lens positioned to direct the combined light output of the array of LEDs to a target light guide,
   a partially reflecting element positioned to reflect a portion of the light output from the condenser lens back toward the LED array, and a light sensor positioned to intercept and measure at least a portion of the reflected light.

2. The LED luminaire of claim 1 further comprising;

means for supplying electrical current to said LED array, whereby said LEDs in each said color have a light output, and the LED array has a combined light output, means for providing the reflected light output of each color separately to the light sensor, means for comparing the measured light output for each color to a respective desired light output for each color, and means for adjusting the electrical current to the LEDs in each color based on said comparison, whereby a desired combined light output may be achieved.

3. The LED luminaire of claim 2 in which the means for providing the reflected light output of each color separately to the light sensor comprises means for selectively turning off the LEDs so that the light sensor measures the light output for each color separately in a series of time pulses.

4. The LED luminaire of claim 2 in which the means for providing the reflected light output of each color separately to the light sensor comprises color filter means for selectively filtering out the light output of each separate LED color.

5. The LED luminaire of claim 4 in which the light sensor comprises an array of photodiodes.

6. The LED luminaire of claim 5 in which color filter means comprises separate color filters associated with the individual photodiodes.

7. The LED luminaire of claim 5 in which the light sensor additionally comprises a light diffuser and a light integrator.

8. An LED luminaire comprising;

an array of LEDs comprising at least one LED in each of a plurality of colors, a condenser lens positioned to direct the combined light output of the array of LEDs to a target light guide, and an array of light sensors, each light sensor associated with an LED or a partial array of LEDs, each light sensor positioned to intercept and measure at least a portion of the light output of its associated LED or partial array of LEDs, at least first and second ones of the light sensors being adapted to intercept and measure light output from mutually-exclusive subsets of the LEDs.

9. The LED luminaire of claim 8 further comprising;

means for supplying electrical current to said LED array, whereby said LEDs in each said color have a light output, and the LED array has a combined light output, means for comparing the measured light output for each color to a respective desired light output for each color, and means for adjusting the electrical current to the LEDs in each color based on said comparison, whereby a desired combined light output may be achieved.

10. The LED luminaire of claim 8, further comprising a filter configured and arranged with the first light sensor to pass light from a first one of the mutually-exclusive subsets of the LEDs to the first light sensor and to filter light from a second one of the mutually-exclusive subsets of the LEDs.

11. The LED luminaire of claim 10, further comprising a second filter configured and arranged with the second light sensor to pass light from the second one of the mutually-exclusive subsets of the LEDs to the second sensor and to filter light from the first one of the mutually-exclusive subsets of the LEDs.

12. The LED luminaire of claim 8, wherein the first light sensor is configured and arranged with the array of LEDs such that light from a first one of the mutually-exclusive subsets reaches the first light sensor and that light from a second one of the mutually-exclusive subsets does not reach the first light sensor.

13. The LED luminaire of claim 12, wherein the second light sensor is configured and arranged with the array of LEDs such that light from the second one of the mutually-exclusive subsets reaches the second light sensor and that light from the first one of the mutually-exclusive subsets does not reach the second light sensor.

14. An LED luminaire comprising an array of LEDs comprising at least one LED in each of a plurality of colors, a condenser lens positioned to direct the combined light output of the array of LEDs to a target light guide, and an array of light sensors, each light sensor associated with an LED or a group of three LEDs, each light sensor positioned to intercept and measure at least a portion of the light output of its associated LED or group of LEDs.

* * * * *